(12) United States Patent
Baba

(10) Patent No.: US 6,809,867 B2
(45) Date of Patent: Oct. 26, 2004

(54) ILLUMINATING OPTICAL SYSTEM AND PROJECTION DISPLAY DEVICE INCLUDING IT

(75) Inventor: Tomoyuki Baba, Ageo (JP)

(73) Assignee: Fuji Photo Optical Co., Ltd., Saitama City (JP)

( * ) Notice: Subject to any disclaimer, the term of this patent is extended or adjusted under 35 U.S.C. 154(b) by 0 days.

(21) Appl. No.: 10/463,552

(22) Filed: Jun. 18, 2003

(65) Prior Publication Data

US 2003/0234983 A1 Dec. 25, 2003

(30) Foreign Application Priority Data

Jun. 25, 2002 (JP) ........................................ 2002-184676

(51) Int. Cl.[7] ........................ G02B 27/10; G03B 27/54; G03B 21/00
(52) U.S. Cl. ........................ 359/619; 359/621; 353/31; 355/67
(58) Field of Search ................................ 359/619, 621, 359/634; 353/31; 355/53, 67, 71; 362/268

(56) References Cited

U.S. PATENT DOCUMENTS 6,050,689 A * 4/2000 Nakamura et al. ............ 353/31

* cited by examiner

Primary Examiner—Georgia Epps
Assistant Examiner—William Choi
(74) Attorney, Agent, or Firm—Arnold International; Jon W. Henry; Bruce Y. Arnold (57) ABSTRACT

An illuminating optical system includes a light source that produces a light beam generally parallel to its optical axis toward a pair of fly-eye lenses in optical series for mixing light in the light beam in order to provide more uniform illumination. A condensing optical system converges and deflects the light from the fly-eye lens at an angle to a generally planar reflective display device, such as a liquid crystal display device. The fly-eye lenses and the reflective display device are parallel or nearly parallel to one another. The fly-eye lenses may be centered on the optical axis of the light source, and the optical axis of the light source may be parallel, or nearly parallel, to the direction that light from the reflective display device is reflected. A projection display device may include a projection lens that focuses the light from the reflective display device onto a screen.

20 Claims, 7 Drawing Sheets

ns and projection display device including it

BACKGROUND OF THE INVENTION

Figure 7:
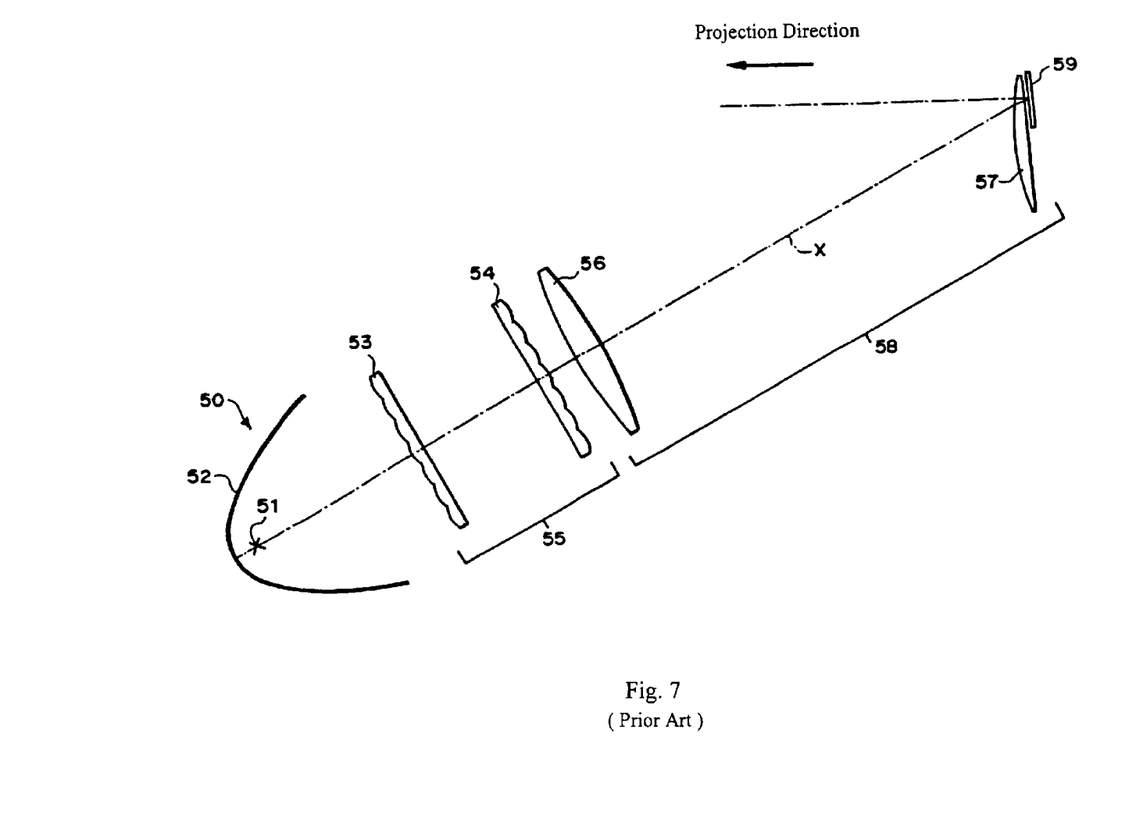
FIG. 7 shows a cross-sectional view of a conventional illuminating optical system for a projection display device.

Recently, in the field of the projection display devices, transmissive and reflective liquid crystal display devices and DMD display devices, which include micromirrors in an orderly array, are known as light valves that modulate light in order to produce image light signals. Among these projection display devices, decentered illuminating optical systems that illuminate reflective liquid crystal or DMD display devices from angles not perpendicular to the planes of the display devices are known. FIG. 7 shows an example of a projection display device having such a construction, using a reflective-type liquid crystal display panel 59 as a projection display device. This projection display device can be made very small, achieve high light efficiency, and is capable of providing an image with high image quality.

As shown in FIG. 7, the illuminating optical system includes a light source 50 that includes a light emitter 51 and a reflector 52 having a parabolic surface. The light source 50 emits a beam of substantially collimated light along an optical axis X defined by the axis of rotational symmetry of the parabolic reflector. An integrator unit 55 includes a first integrator plate that is a first fly-eye lens 53 that receives the illuminating light beam from the light source 50 and a second integrator plate that is a second fly-eye lens 54 that receives the illuminating light beam from the first integrator plate and that transmits the illuminating light toward a liquid crystal display panel 59. The fly-eye lenses of each of the two integrator plates includes a two-dimensional ordered array of microlenses. Each microlens has a similar cross-sectional shape to the effective image display area of the liquid crystal display panel 59.

The first fly-eye lens 53 divides the light having nonuniform brightness emitted from the light source 50 into a plurality of partial beams of light corresponding to the plurality of microlenses of the first fly-eye lens 53. It also converges each of the partial beams of light near the second fly-eye lens 54. The brightness of the partial beams of light after the division is more uniform that before the division.

The second fly-eye lens 54 includes microlenses individually corresponding to the microlenses of the first fly-eye lens 53. The second fly-eye lens 54 processes a plurality of secondary light source images formed by the first fly-eye lens 53 to form images on an illumination plane of the reflective-type liquid crystal display panel 59 via a condensing optical system 58 that includes lenses 56 and 57. On the illumination plane, more uniform illumination is realized compared to the illumination incident on the integrator unit 55 because partial beams from different microlenses of the second fly-eye lens 54 overlay one another. After being reflected from the liquid crystal display panel 59, the beam of light carrying the image information is projected onto a screen by a projection lens (not shown in FIG. 7).

Conventional illuminating systems, such as that described above, for providing more or less uniform illumination on the illumination plane using two fly-eye lenses are well known. However, in the above described illuminating system, although the two fly-eye lenses 53 and 54 are used to help provide uniform illumination on the liquid crystal display panel 59, there has been a problem that the distribution of the illumination is not adequately uniform because the two fly-eye lenses 53 and 54 are placed in tilted positions relative to the position of the liquid crystal display panel 59, as shown in FIG. 7. In the case of placement as shown in FIG. 7, a plurality of secondary light sources are formed by the first fly-eye lens 53 on a plane that is substantially perpendicular to the optical axis X. However, because the liquid display panel 59 is tilted relative to that plane, the distances between the plurality of secondary light source images and the liquid crystal display panel 59 vary depending on the location of the second light source images above or below the optical axis X, with those above being farther away than those below. As a result, the brightness of the illuminating light on the liquid crystal device varies significantly between the top and the bottom of the liquid crystal display panel 59.

BRIEF SUMMARY OF THE INVENTION

The present invention relates to illuminating optical systems and projection display devices with uniform illumination of the reflective display devices using two fly-eye lenses in series preceding the reflective display devices. Additionally, the present invention relates to such illuminating optical systems and projection display devices that may use reflective display devices, such as reflective-type liquid crystal display devices or DMD display devices, with the illuminating optical systems arranged to provide more uniform illumination of the reflective image display devices.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

A general description of illuminating optical systems and projection display devices that include illuminating optical systems of the present invention will first be described, with various distinctions between various embodiments being pointed out. In an illuminating optical system according to the present invention, an optical integrator is provided with two fly-eye lenses. The first of these fly eye lenses transforms illuminating light by forming a plurality of secondary light source images corresponding to a plurality of divided portions of generally collimated light from a light source. The second of these fly eye lenses optically processes the light of the secondary light source images before the light passes through a condensing optical system and is incident onto a generally planar reflective display device that reflects the light according to predetermined image information. The illuminating light strikes the generally planar reflective display device at predetermined incident angles so that the light is reflected from the reflective display device. The two fly-eye lenses and the generally planar reflective display device are placed parallel or nearly parallel to each other (meaning within 20° of being parallel). Each of the two fly-eye lenses is formed of a two-dimensional array of microlenses.

It is desirable that the light source defines an optical axis that passes through the geometrical centers of the fly-eye lenses. In some embodiments, it is desirable that one of the two fly-eye lenses is shifted relative to the other in a direction perpendicular to the direction of the optical axes of the microlenses of the fly-eye lenses. In some embodiments, it is desirable that the light source defines an optical axis that is parallel or nearly parallel to the optical axes of the microlenses of both fly-eye lenses and the geometrical centers of both fly-eye lenses are aligned with the light source optical axis. In some embodiments, it is desirable that the planes in which the two fly-eye lenses lie are parallel to one another and a line perpendicular to those planes passes through the geometrical centers of both fly-eye lenses.

In some embodiments, it is desirable that the two fly-eye lenses are perpendicular to the optical axis defined by the light source and that the optical axes of all of the microlenses of both fly-eye lenses are parallel to that optical axis.

In some embodiments, it is desirable that the microlenses of one of the fly-eye lenses include microlenses that are decentered from their optical axes. Additionally, it is desirable in such embodiments that the direction and the amount of the decenter of the microlenses be the same in all the decentered microlenses.

In some embodiments, the condensing optical system may include a prism between the second fly-eye lens and the reflective display device for changing the direction of the illuminating light. In some embodiments a mirror may be placed in the illuminating optical system, for example, between the second fly-eye lens and the reflective display device, for changing the direction of the illuminating light.

The projection display device of the present invention includes an illuminating optical system and a projection lens for projecting images on a screen from the light modulated by the reflective display device. The light reflected by the reflective display device travels generally along an optical axis that extends perpendicular to a screen that receives the image formed by the light modulated by the reflective display device.

Embodiments 1–3 and two modifications will be explained with further reference to the drawings.

Embodiment 1

Figure 1:
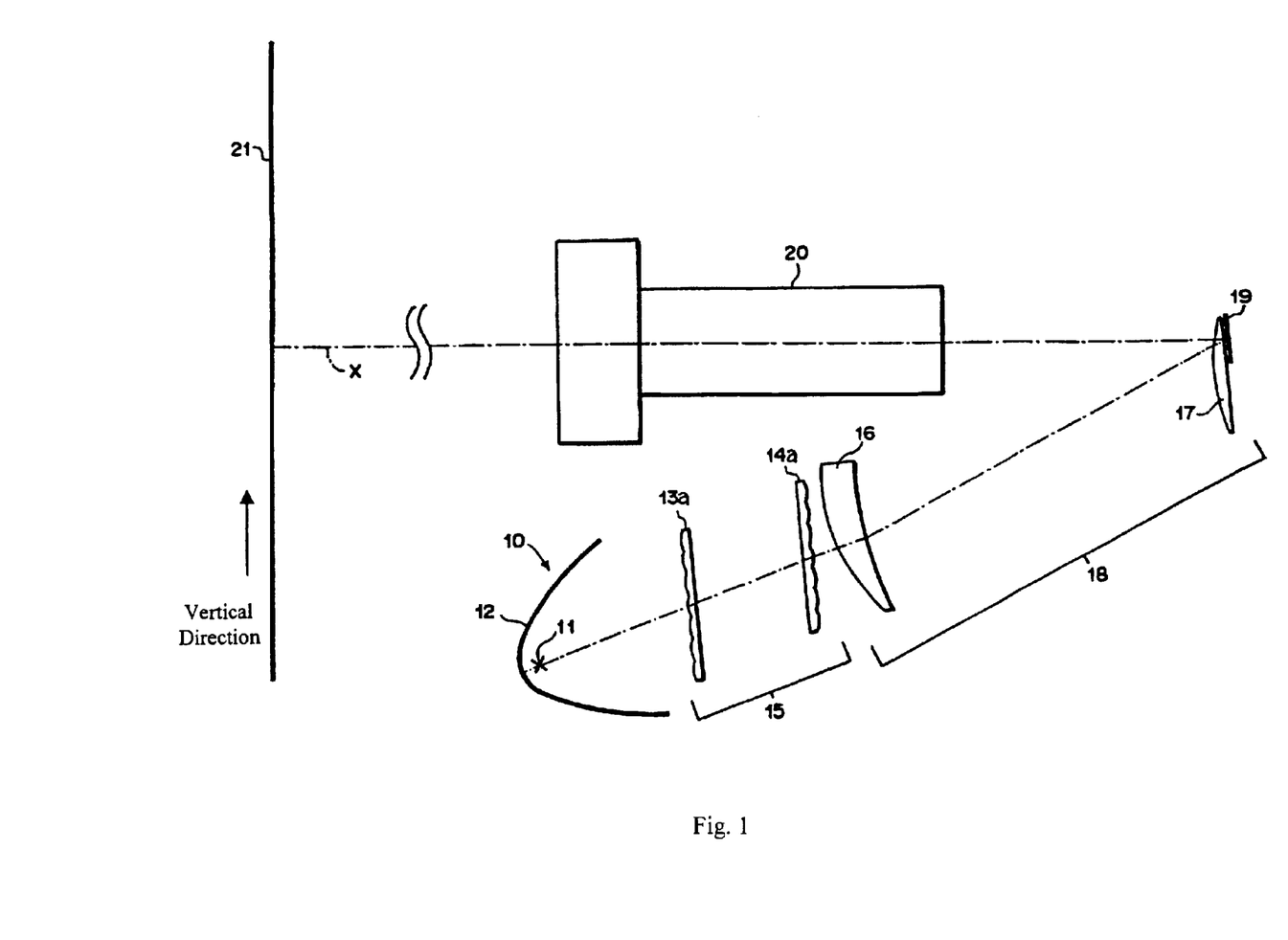
FIG. 1 shows a cross-sectional view of a projection display device according to Embodiment 1.

FIG. 1 shows a cross-sectional view of a projection display device according to Embodiment 1. As shown in FIG. 1, the projection display device of Embodiment 1 includes a light source 10, an integrator unit 15 to make more uniform the distribution of light by mixing the light beams of light emitted from the light source 10, a condensing optical system 18, a reflective liquid crystal display panel 19 for imparting image information onto a light beam using a uniformly illuminated liquid crystal display panel 19, and a projection lens 20 for projecting the beam of light carrying the image information onto a screen 21 as a magnified image.

As shown in FIG. 1, the light source 10 includes a light emitter 11, for example, an electric discharge tube such as a xenon lamp or a metal halide lamp, and a parabolic reflector 12. The light emitter 11 is at the focus of the reflector 12. The reflector 12 reflects light from the light emitter 11 forward as part of a substantially collimated light beam along the optical axis X defined by the axis of rotational symmetry of the parabolic reflector.

The integrator unit 15 includes a first fly-eye lens 13a that receives a beam of light from the light source 10 and a second fly-eye lens 14a that projects the beam of light from each microlens of the second fly-eye lens 14a toward the reflective liquid crystal display panel 19. The two fly-eye lenses 13a and 14a each include a plurality of microlenses arranged in a two-dimensional orderly array, and each microlens has a cross-sectional shape similar to the light reflective area of the liquid crystal display panel, as will be described later.

The first fly-eye lens 13a divides the substantially collimated light having nonuniform brightness emitted from the light source 10 into a plurality of partial beams of light corresponding to its plurality of microlenses. It also converges each of the partial beams of light near the second fly-eye lens 14a. The second fly-eye lens 14a has microlenses corresponding to the microlenses of the first fly-eye lens 13a. The second fly-eye lens 14a overlays images of a plurality of light source images formed by the first fly-eye lens 13a at an illumination plane on the reflective liquid crystal display panel 19 via a condensing optical system 18 that includes lenses 16 and 17. On the illumination plane, more uniform illumination is achieved by the light from the partial beams discussed above overlaying one another at the illumination plane.

The illumination light formed in this manner strikes the reflective liquid crystal display panel 19 at incident angles non-normal to the reflective liquid crystal display panel 19, is modulated according to the image information, and is generally reflected in a different direction from the incident light in order to project a magnified image onto screen 21 via projection lens 20.

It is desirable that the incident angles as measured from the surface normal be chosen so that nothing interferes with the light being incident onto or reflected from the reflective liquid crystal display panel. For example, the incident angles are chosen so that members, such as deflecting plates, of the liquid crystal display panels do not block incident or reflected light.

In Embodiment 1, as shown in FIG. 1, the plane of the microlenses of the first fly-eye lens 13a, the plane of the microlenses of the second fly-eye lens 14a, and the reflective-type liquid crystal display panel 19 are placed parallel or nearly parallel to one another. With this arrangement, a plurality of secondary light source images are formed by the microlenses of the first fly-eye lens 13a on a plane that is substantially perpendicular to the optical axes of the second fly-eye lens 14a near microlenses of the second fly-eye lens 14a that correspond to microlenses of the first fly-eye lens 13a. Furthermore, the images of the secondary light source overlay one another on the illuminating plane of the reflective liquid crystal display panel 19 that is parallel or nearly parallel to the plane of the plurality of secondary light images. Because the first fly-eye lens 13a, the second fly-eye lens 14a, and the liquid crystal display panel 19 are placed parallel or nearly parallel to each other, the distances between each of the plurality of secondary light source images and their corresponding image area on the liquid crystal display panel 19 are almost identical at any part of the liquid crystal display panel 19, resulting in a highly uniform distribution of illuminating light on the illuminating plane.

The parallel or nearly parallel placement relative to each other of the three parts, namely, the first fly-eye lens 13a, the second fly-eye lens 14a, and the reflective liquid crystal display panel 19 and how the illuminating light is processed so as to strike the reflective-type liquid crystal display panel at an angle other than substantially perpendicular to the plane of the reflective-type liquid crystal display panel will first be explained with regard to Embodiment 1 below.

As shown in FIG. 1, in Embodiment 1, the second fly-eye lens 14a, which is parallel or nearly parallel to the first fly-eye lens 13a, is shifted in a direction perpendicular to the optical axes of the microlenses of both fly-eye lenses 13a and 14a. With this shifted position, the liquid crystal display panel 19 is placed near an extension of the line connecting the centers of the two fly-eye lenses 13a and 14a so that the illuminating light, with further deflection by the condensing optical system, can strike the liquid crystal display panel 19 with the desired incident angles.

The condensing optical system deflects and converges the light from the second fly-eye lens 14a. The condensing optical system 18 includes a decentered lens 16 that is a meniscus lens having positive refractive power arranged so that an edge portion of the decentered lens 16 deflects light processed by the light integrator 15 and a decentered lens 17 that uses an edge portion of a convex lens in order to transmit illuminating light onto the liquid crystal display panel 19 from the decentered lens 16. The decentered lenses are lenses in which the optical center of the lens is displaced from its geometric axis of symmetry. The use of such lenses allows adjustment of the angle of incidence for the illuminating light onto the liquid crystal display panel 19 with less shifting of the first and second fly-eye lenses. In addition, the use of a meniscus lens 16 having positive refractive power with its convex lens surface on the light source side is effective in adjusting astigmatism, and the effective area of the liquid crystal display panel having a shape similar to the fly-eye lenses 13a and 14a helps improve the efficiency of the illumination. In addition, having the lens 17 placed close to the liquid crystal display panel 19 helps to narrow the angle of incidence of the illuminating light to the liquid crystal display panel 19. With the illuminating light striking the liquid crystal display panel from a direction that is not normal to the liquid crystal display panel, when the liquid crystal display panel is used as an image display device, it is desirable that the angle of incidence be small in order to provide good imaging.

In addition, by making the lenses 16 and 17 of the condensing optical system 18 to include aspheric lens surfaces or by adding other aspheric lenses in the condensing optical system 18, further improvement in astigmatism that results in greater illumination efficiency can be achieved.

As shown in FIG. 1, the two fly-eye lenses 13a and 14a and the light source 10 are placed so that they are parallel or nearly parallel to one another and the optical axis of the light source 10 passes through the centers of the two fly-eye lenses 13a and 14a. The two fly-eye lenses 13a and 14a are not necessarily the same size or positioned as shown in FIG. 1. However, when the two fly-eye lenses 13a and 14a have the same construction and the optical axis of the light source 10 passes through the centers of the two fly-eye lenses 13a and 14a, the light passing through the centers of the fly-eye lenses is parallel to the optical axis. The illumination efficiency becomes its maximum when the optical axis of the light source 10 passes through the centers of the two fly-eye lenses 13a and 14a.

Embodiment 2

Figure 2:
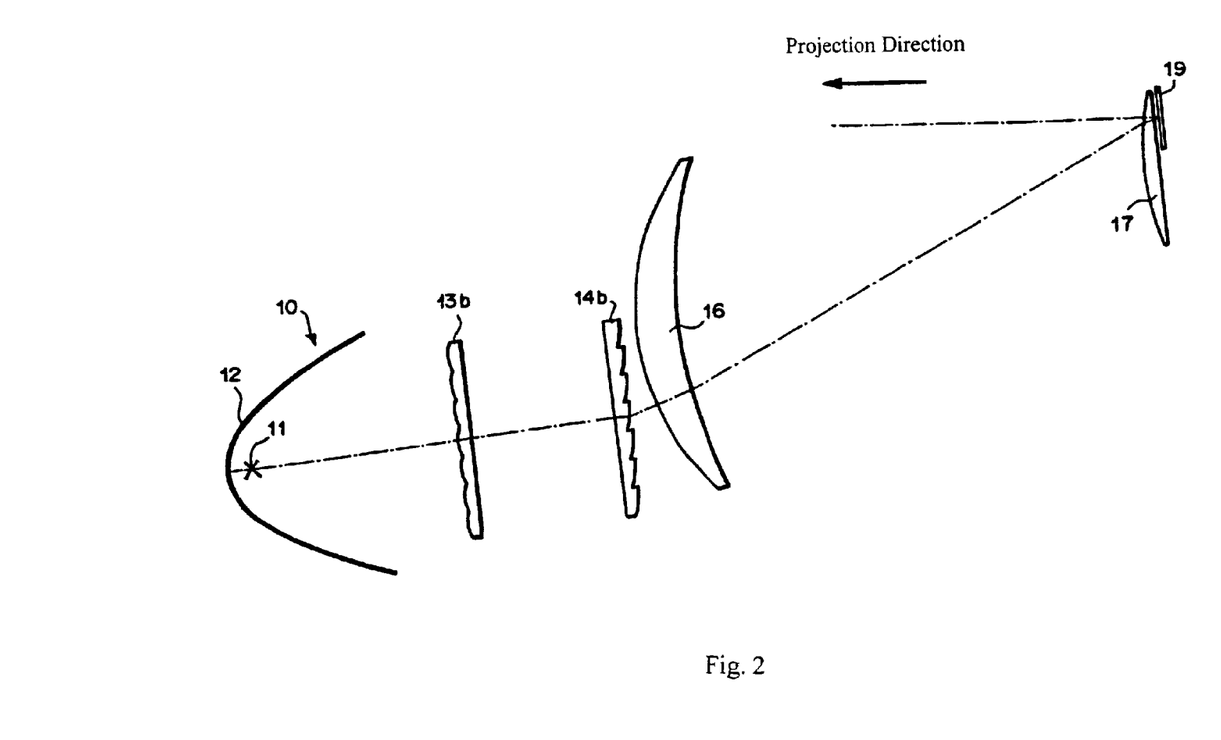
FIG. 2 shows a cross-sectional view of a projection display device according to Embodiment 2.

FIG. 2 shows a cross-sectional view of an illuminating optical system for a projection display device according to Embodiment 2. Other than the integrator unit, the optical elements of Embodiment 2 are the same as those of Embodiment 1. Therefore, the same reference numerals are given to the components that are unchanged from Embodiment 1 and their descriptions are not repeated. In that regard, FIG. 2 shows meniscus lens 16 completely whereas FIG. 1 shows only the portion of meniscus lens 16 that receives illuminating light.

In Embodiment 2, the second fly-eye lens 14b of the integrator unit is parallel or nearly parallel to the first fly-eye lens 13b, and the fly-eye lenses are arranged so that their geometrical centers lie along the optical axis of the light source 10, which maximizes the illumination efficiency. When this placement is achieved, and when a similar lens to the second fly-eye lens 14b is placed at the position of the first fly-eye lens 13b, it is possible for the illuminating light to be incident onto the liquid crystal display panel 19 at a predetermined angle which depends on the refractive power of the condensing optical system that follows the integrator unit. However, in Embodiment 2, by making the microlenses of the second fly-eye lens 14b to be decentered from their optical axes in the vertical direction, as shown in FIG. 2, the direction of the illuminating light exiting the integrator unit is more nearly aligned with the direction desired for light striking the liquid crystal display panel 19. Compared to Embodiment 1, which changes the direction of the light by using the refracting power of the condensing optical system alone, it is preferable to change the direction of the illuminating light by using the action of the second fly-eye lens 14b, as shown in FIG. 2, because this reduces the refracting power required of the condensing optical system, which in turn reduces astigmatism aberration.

Figure 3A:
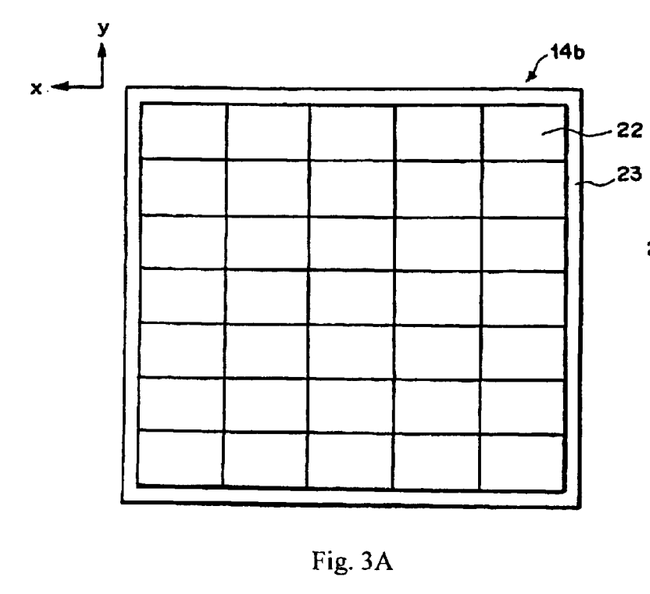
FIGS. 3A, 3B, and 3C show front, side, and top views, respectively, of a fly-eye lens used in Embodiment 2.
Figure 3B:
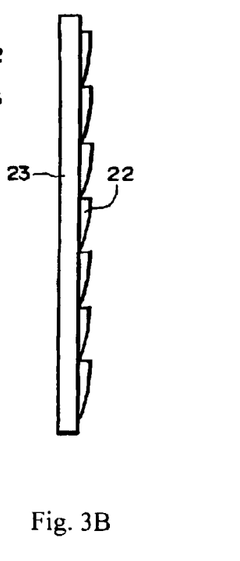
Figure 3C:
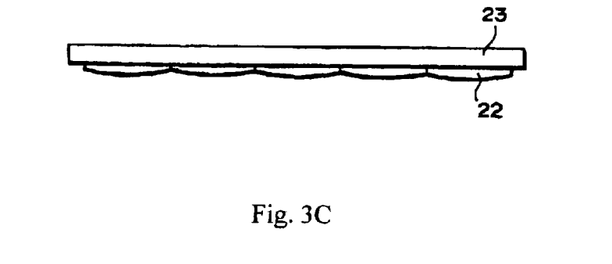

FIGS. 3A, 3B, and 3C show front, side, and top views, respectively, of the second fly-eye lens 14b used in Embodiment 2. As shown in FIGS. 3A–3C, the second fly-eye lens 14b includes a holder 23 at its periphery and a plurality of rectangular microlenses 22 arranged in an array with their sides in contact within the holder. The microlenses 22 have their optical centers displaced above the geometrical centers as shown in FIG. 3B so that the illuminating light is deflected upward as shown in FIG. 2.

Furthermore, although FIG. 3A shows a seven by five array of microlenses 22, the number of columns and rows of microlenses may be widely varied. Additionally, the microlenses may have different cross-sectional shapes than the identical rectangular cross-sectional shapes illustrated in FIG. 3A. Furthermore, although the microlenses 22 of the second fly-eye lens 14b are shown as decentered in one direction (see FIG. 3B) but not in an orthogonal direction (see FIG. 3C), the amount of decentering in both directions may be varied based on the output direction of the illuminating light desired. When the microlenses are identical and identically decentered, as shown in FIGS. 3A–3C, the second fly-eye lens 14b may be produced easily and inexpensively.

Embodiment 3

Figure 4:
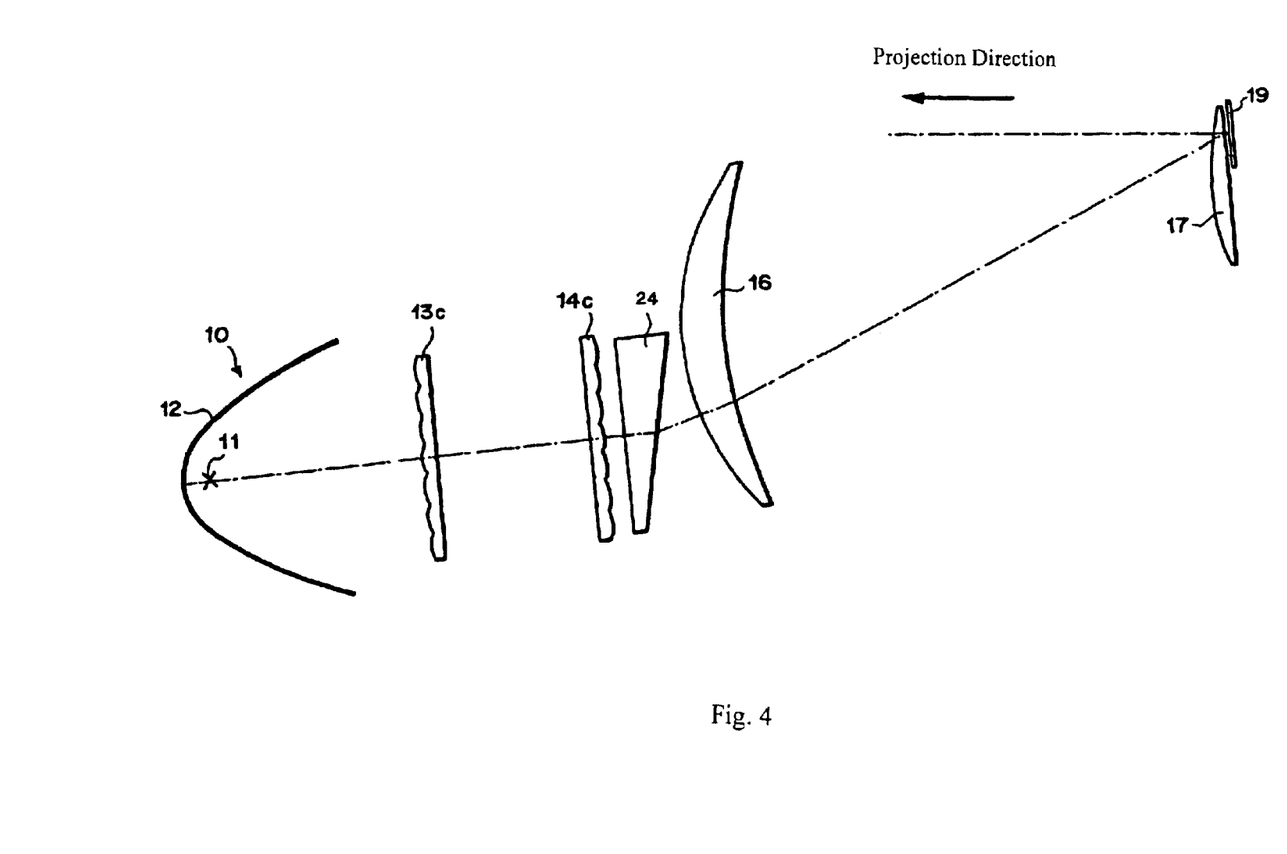
FIG. 4 shows a cross-sectional view of a projection display device according to Embodiment 3.

FIG. 4 shows a cross-sectional view of an illuminating optical system for a projection display device according to Embodiment 3. Other than the integrator unit and the presence of a prism 24, the components of Embodiment 3 are the same as those of Embodiment 1. Therefore, the same reference numerals are given to the components that are unchanged from Embodiment 1 and their descriptions are not repeated. In that regard, FIG. 4 shows meniscus lens 16 completely whereas FIG. 1 shows only the portion of meniscus lens 16 that receives illuminating light.

However, unlike Embodiment 1, but like Embodiment 2, the fly-eye lenses 13c and 14c are placed substantially perpendicular to the optical axis defined by the axis of rotational symmetry of the parabolic reflector 12. In Embodiment 3, the microlenses of both of the fly-eye lenses 13c and 14c have their optical and geometrical centers coincident and the prism 24 deflects the illuminating light toward lenses 16 and 17 and liquid crystal display panel 19.

Instead of a deflecting prism, such as prism 24, an optical component that has a converging effect, such as a Fresnel lens or a diffractive optical element, may be used to deflect the illuminating light. Additionally, whatever type of component is used, it may be placed at various locations in the illuminating optical system. Furthermore, by having the optical component that deflects the illuminating light include a converging function, such as by the use of a Fresnel lens, astigmatism aberration may be reduced by reducing the refractive power of the other converging lens elements in the illuminating optical system.

In Embodiments 1–3 described above, two fly-eye lenses and a reflective liquid crystal display panel are arranged so as to be parallel or nearly parallel to one another so that illuminating light from a light source strikes the liquid crystal display panel at a predetermined angle. In order to reduce the size of the illuminating optical system, one or more folding mirrors may be used.

Generally, the optical axes of arc-type lamps are designed for horizontal or vertical use, with horizontal-type lamps being commonly used for projectors. In FIGS. 1–4, the lamp axes are inclined. Rather than having the lamp axis inclined (i.e., not horizontal), a mirror can be used so as to redirect the light output from the light source in a desired direction.

Figure 5:
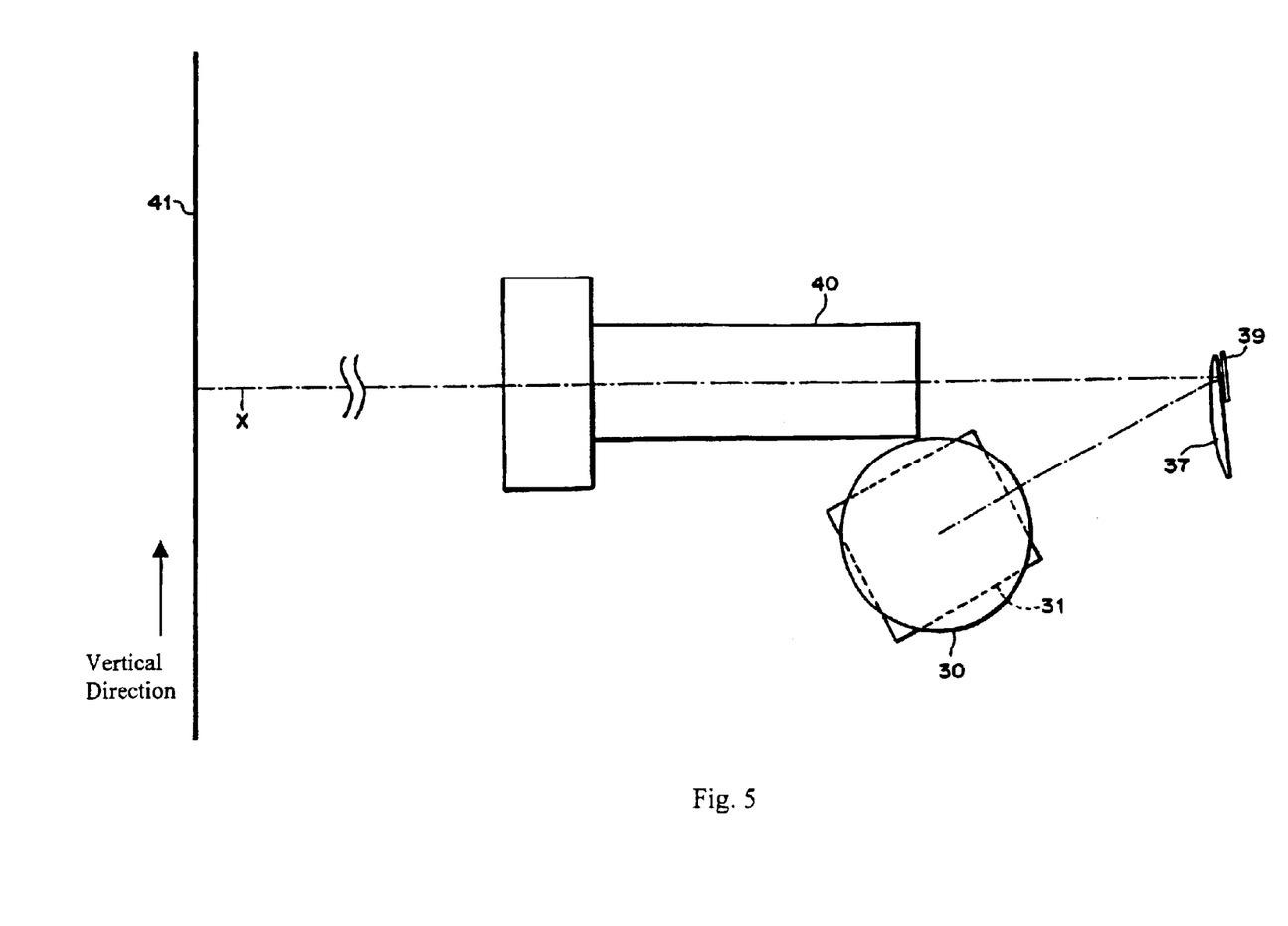
FIG. 5 shows a side view of a first modification of Embodiment 1.

FIG. 5 shows a side view of a first modification of Embodiment 1 that has such a construction. As shown in FIG. 5, the illuminating optical system includes a folding mirror 31 that changes the direction of the illuminating light between the fly-eye lenses (not shown in FIG. 5) and the reflective-type liquid crystal display panel 39 so that the optical axis of a lamp of the light source 30 can be substantially horizontal. Substantially collimated light from the light source 30 passes through a light integrator and a decentered lens (as shown in FIG. 1, but not shown in FIG. 5) before it strikes the folding mirror 31 that reflects the light through decentered lens 37 for reflection from the liquid crystal display panel 39 that modulates the light with image information. Then, the light reflected from the liquid crystal display panel 39 passes through the decentered lens 37 along an optical axis X through projection lens 40 so as to provide a magnified image on the screen 41. The angle of the folding mirror 31 is set, despite the optical axis of the lamp of the light source being substantially horizontal, so that the direction of light that is reflected from the folding mirror 31 is appropriate for incidence onto the plane of the reflective liquid crystal display device 39.

In the arrangement of FIG. 5, the optical axis of the light source 30 is substantially perpendicular to the plane of FIG. 5 and the fly-eye lenses are placed in planes parallel or nearly parallel to the plane of FIG. 5 so that the folding mirror 31 reflects the illuminating beam substantially in the plane of FIG. 5 at a predetermined angle in that plane in order to achieve the beneficial effects of the arrangements of Embodiments 2 and 3 with regard to the optical axis of the lamp of the light source being substantially horizontal. However, Embodiments 2 and 3 may also be varied so as to include a folding mirror as desired.

Figure 6:
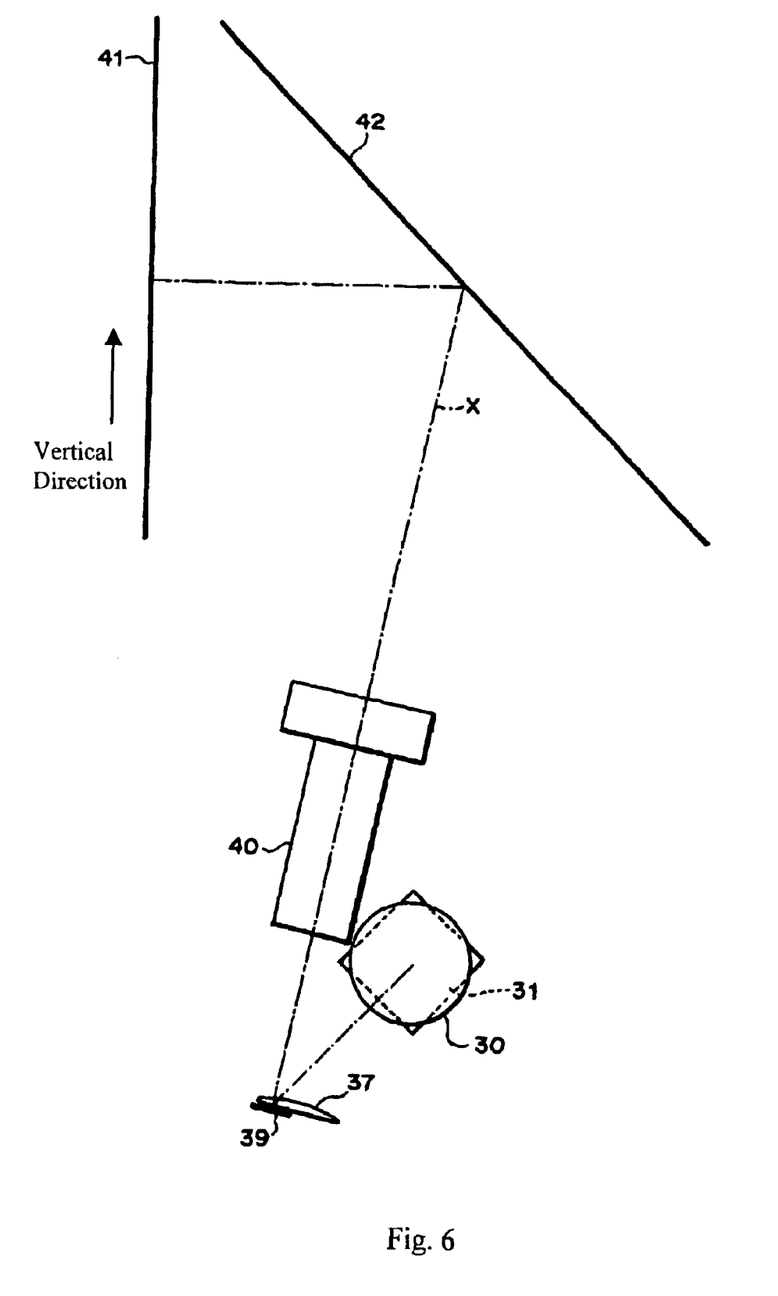
FIG. 6 shows a side view of a second modification of Embodiment 1.

FIG. 6 shows a projection display device with a folding mirror 42 for changing the direction of the light output by the projection lens 40 in the arrangement of FIG. 5. The use of two folding mirrors, 31 and 42 as shown in FIG. 6, is especially effective in reducing the size of the projection display device.

The invention being thus described, it will be obvious that the same may be varied in many ways. For example, the lens shape of the condensing optical system and the number of the lenses may be varied. In addition, the image display devices are not limited to reflective liquid crystal display devices, but other image display devices, such as digital micromirror devices (DMD's) using a plurality of micromirrors may be used. In this case, it is necessary that the light strike the display panel at an angle that is not perpendicular to the plane of the display panel, so it may not be necessary to include a lens, such as lens 17 of Embodiments 1–3 above, to reduce the angle of incidence. In addition, in order to display a color image, color separating and/or color synthesizing prisms may be placed in front of the reflective display device so that the image information for each separated color is carried by a different display device. In addition, a color wheel may be placed, for example, between a light source and an integrator unit in order to display a color image. Furthermore, the illuminating optical systems described above may be applied to various other devices that use uniform illumination and thus are not limited to use with the projection display devices discussed above. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An illuminating optical system comprising, in order:
   a light source for producing a generally collimated light beam;
   a first fly-eye lens for forming a plurality of secondary light source images from different portions of said generally collimated light beam;
   a second fly-eye lens for optically processing said plurality of secondary light source images;
   a condensing optical system for deflecting and converging light from said second fly-eye lens; and
   a generally planar reflective display device for receiving incident light from the condensing optical system in a direction other than perpendicular to the plane of the generally planar reflective image display device so that the light reflected from said reflective image display device is reflected in a different direction from the direction of the incident light; wherein
   the first fly-eye lens, the second fly-eye lens, and the generally planar reflective display device lie in planes that are parallel or nearly parallel to one another.

2. The illuminating optical system of claim 1, wherein one of said fly-eye lenses is shifted relative to the other of said fly-eye lenses in a direction having a component perpendicular to the optical axes of both of said fly eye lenses.

3. The illuminating optical system of claim 2, wherein an optical axis of the light source is substantially aligned with the geometrical centers of the two fly-eye lenses.

4. The illuminating optical system of claim 3, wherein the second fly-eye lens include a plurality of microlenses that are decentered from their individual optical axes.

5. The illuminating optical system of claim 3, wherein the condensing optical system is placed between the second fly-eye lens and the reflective display device and the condensing optical system includes a prism for deflecting the illuminating light.

6. The illuminating optical system of claim 3, wherein:

the light source defines an optical axis; and a mirror for reflecting the illuminating light is placed between the second fly-eye lens and the reflective display device so that the optical axis of a lamp of the light source can be oriented substantially horizontal.

7. A projection display device comprising:

the illuminating optical system of claim 3; and a projection lens for projecting an image formed by illuminating light modulated by reflection from the reflective display device.

8. The illuminating optical system of claim 2, wherein the second fly-eye lens includes a plurality of microlenses that are decentered from their individual optical axes.

9. The illuminating optical system of claim 2, wherein the condensing optical system is placed between the second fly-eye lens and the reflective display device and the condensing optical system includes a prism for deflecting the illuminating light.

10. The illuminating optical system of claim 2, wherein:

the light source defines an optical axis; and a mirror for reflecting the illuminating light is placed between the second fly-eye lens and the reflective display device so that the optical axis of a lamp of the light source can be oriented substantially horizontal.

11. A projection display device comprising:

the illuminating optical system of claim 2; and a projection lens for projecting an image formed by illuminating light modulated by reflection from the reflective display device.

12. The illuminating optical system of claim 1, wherein the planes in which the two fly-eye lenses lie are parallel or nearly parallel to one another and a line perpendicular to those planes passes through the geometrical centers of both fly-eye lenses.

13. The illuminating optical system of claim 12, wherein the light source defines an optical axis that is parallel or nearly parallel to the optical axes of the microlenses of both fly-eye lenses and the geometrical centers of both fly-eye lenses are substantially aligned with said optical axis.

14. The illuminating optical system of claim 13, wherein the second fly-eye lens includes a plurality of microlenses that are decentered from their individual optical axes.

15. The illuminating optical system of claim 12, wherein the second fly-eye lens includes a plurality of microlenses that are decentered from their individual optical axes.

16. The illuminating optical system of claim 1, wherein the second fly-eye lens includes a plurality of microlenses that are decentered from their individual optical axes.

17. The illuminating optical system of claim 16, wherein the direction and amount of decentering of each microlens of said plurality of microlenses from each of their individual optical axes is substantially the same.

18. The illuminating optical system of claim 1, wherein the condensing optical system is placed between the second fly-eye lens and the reflective display device and the condensing optical system includes a prism for deflecting the illuminating light.

19. The illuminating optical system of claim 1, wherein:

the light source defines an optical axis; and a mirror for reflecting the illuminating light is placed between the second fly-eye lens and the reflective display device so that the optical axis of a lamp of the light source can be oriented substantially horizontal.

20. A projection display device comprising:

the illuminating optical system of claim 1; and a projection lens for projecting an image formed by illuminating light modulated by reflection from the reflective display device.

* * * * *

UNITED STATES PATENT AND TRADEMARK OFFICE
CERTIFICATE OF CORRECTION

PATENT NO. : 6,809,867 B2
DATED : October 26, 2004
INVENTOR(S) : Baba

It is certified that error appears in the above-identified patent and that said Letters Patent is hereby corrected as shown below:

Column 1,
Line 44, change "more uniform that" to -- more uniform than --;

Column 2,
Line 6, change "liquid display"" to -- liquid crystal display --;
Lines 58 and 62, change "fly eye" to -- fly-eye --;

Column 8,
Line 58, change "fly eye" to -- fly-eye--; and
Line 63, change "include" to -- includes --.

Signed and Sealed this

Seventeenth Day of May, 2005

JON W. DUDAS
*Director of the United States Patent and Trademark Office*